March 6, 1928.

W. J. LILLICRAPP ET AL 1,661,697

STEERING COLUMN LOCKING DEVICE FOR MOTOR VEHICLES

Filed Feb. 25, 1927

INVENTORS
W. J. LILLICRAPP
D. L. O'SHEA
A. HOGAN

March 6, 1928. 1,661,697
W. J. LILLICRAPP ET AL
STEERING COLUMN LOCKING DEVICE FOR MOTOR VEHICLES
Filed Feb. 25, 1927 2 Sheets-Sheet 2
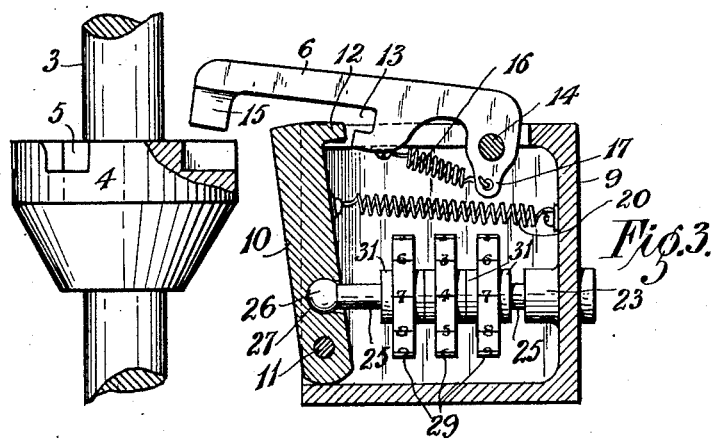
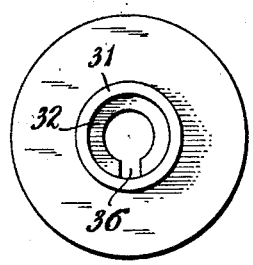
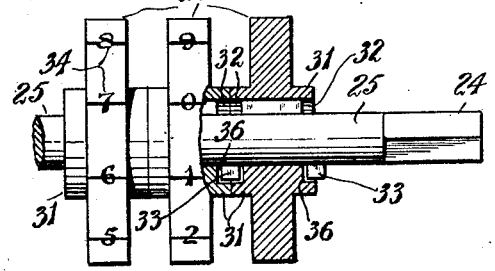
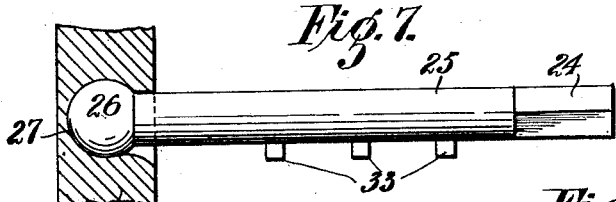
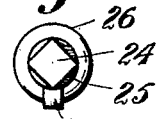
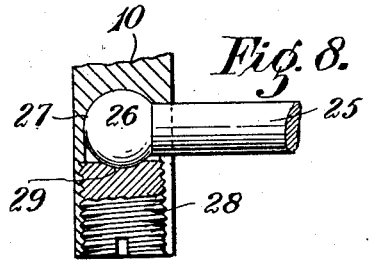
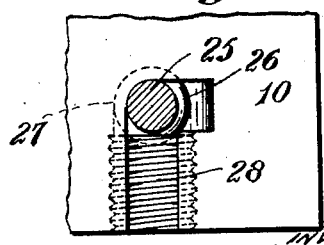
INVENTORS
W. J. LILLICRAPP
D. L. O'SHEA
A. HOGAN Patented Mar. 6, 1928.

1,661,697

UNITED STATES PATENT OFFICE.

WILLIAM JOSEPH LILLICRAPP, OF NORTH MELBOURNE, VICTORIA, AND DANIEL LESLIE O'SHEA AND AUGUSTINE HOGAN, OF EAST BRUNSWICK, VICTORIA, AUSTRALIA.

STEERING-COLUMN LOCKING DEVICE FOR MOTOR VEHICLES.

Application filed February 25, 1927, Serial No. 171,024, and in Australia October 15, 1926.

This invention relates to an improved locking device for use on motor-vehicles to lock the steering column against rotation when the vehicle is left unattended and thus prevent theft or unauthorized use of the vehicle.

The invention provides an improved locking device of the permutation type which can be readily fitted onto the steering column of a motor vehicle and is so constructed as to effectively prevent unintentional locking of the steering column and thus minimize liability of accident.

In the accompanying drawings:—

Figure 3 is a similar view but showing the lock in open position.

Figure 5 is a detail view of permutation wheels and a sliding rod embodied in the lock.

Figure 6 is an end view of one of the permutation wheels.

Figures 7 and 8 are detail views of the sliding rod and its mounting.

Figures 9 and 10 are end views of Figures 7 and 8.

Figure 1:
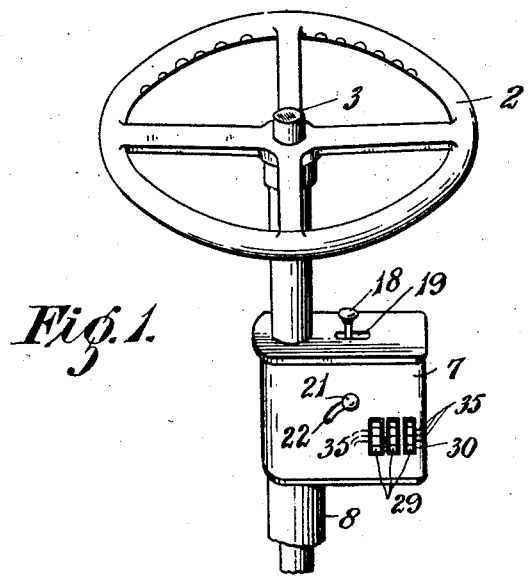
Figure 1 is a perspective view of the improved lock fitted in position on the steering column of a motor-vehicle.
Figure 2:
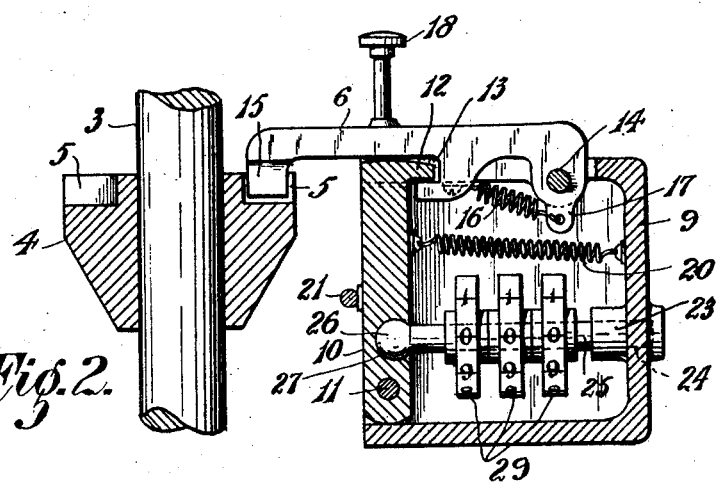
Figure 2 is a cross-sectional view showing the lock in closed position.
Figure 4:
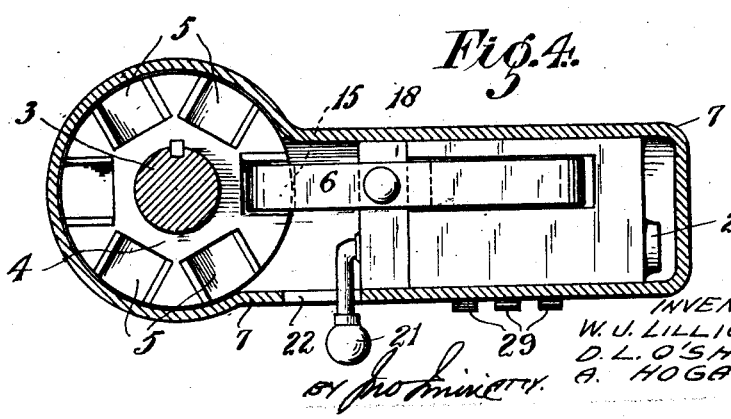
Figure 4 is a sectional plan view of the lock and lock housing.

In these views 2 indicates the steering wheel of a motor-vehicle and 3 the steering column. Keyed or otherwise rigidly secured onto the steering column is a circular clutch block 4 having a series of radial recesses 5 to receive the latch 6 of a permutation lock. The clutch block 4 and the lock are housed in a stout metal casing 7 which is rigidly fastened to the steering column casing 8 and is so constructed as to protect the lock mechanism against interference and injury.

The permutation lock comprises a rectangular casing 9 rigidly fitted within the casing 7 and provided at one end with a locking member 10 which is pivotally mounted on a pin 11 outstanding from the side of said casing. The locking member 10 is provided at its upper end with a tooth 12 adapted to engage a jaw 13 formed on the latch 6. This latch is pivotally mounted at its inner end on a pin 14 outstanding from the lock casing 9, and its outer or free end is fashioned with a downward projection 15 adapted to engage one of the recesses 5 in the clutch block 4.

The latch 6 is normally maintained in open position as is shown in Figure 3, by a coiled spring 16 anchored at one end to the side of the lock casing 9 and attached at its opposite end to a small lug 17 formed on said latch at a point near to its pivot pin 14. A handle 18 is provided on the latch 6 for forcing it downwardly against the spring 16 into locking position, and said handle extends exteriorly of the casing 7 through a slot 19 formed in the upper end thereof. The locking member 10 is normally maintained in closed position by a coiled spring 20 anchored to the lock casing 9, and an actuating handle 21 is provided on said locking member and extends outwardly through a slot 22 in the said casing 7.

Formed in the inner wall of the lock casing 9 is a boss 23 wherein the squared end 24 of a rod 25 is slidably mounted. The opposite end of the rod 25 is in the form of a ball 26 and is swivelly fitted in a socket 27 formed in the locking member 10. The outer end of the socket 27 is screw-threaded and fitted therein is a screw 28 formed with a recessed end 29 to receive the ball 26 and hold the same in position. The said ball 26 and the socket 27 provide a particularly efficient pivot joint between the locking member 10 and the rod 25 of the lock, enabling said rod to be evenly moved in a longitudinal direction when the said locking member is pivotally actuated.

Rotatably mounted on the sliding rod 25 are permutation wheels 29 held rigid against longitudinal movement by having their peripheries extending into slots 30 formed in the face of the casing 7. The wheels 29 each have spacing bosses 31 formed with annular grooves 32 to freely accommodate spaced pins 33 fitted on the sliding rod 25. The peripheries of the wheels 29 bear numbers, letters, or other symbols 34 adapted to be set in selected combinations along indicator lines 35 provided on the casing 7 adjacent to the slots 30. Each of the wheels 29 has a gap 36 cut through its boss 31, and the gaps on different wheels are arranged to correspond with selected numbers or symbols 34 so that when a predetermined combination is set the gaps 36 in all the permutation wheels are in alignment with the pins 33 on the sliding rod 25.

To lock the steering column 3 against rotation, the permutation wheels 29 of the lock are first rotated until the correct combination of symbols 34 is aligned as required along the indicator lines 35, thereby bringing the gaps 36 of said wheels into alignment with the pins 33 of the rod 25. Said rod is now free to slide longitudinally through the wheels 29 permitting the handle 21 to be actuated to pivotally move the locking member 10 outwardly on its pin 11, thus moving the lug 12 clear of the jaw 13 of the latch 6. The said latch 6 is now depressed by the handle 18 and causes the tooth 15 to engage one of the recesses 5 in the clutch block 4, whereupon the handle 21 is released and allows the coiled spring 20 to move the locking member 10 inwardly to engage the lug 12 in the jaw 13, thus holding the latch 6 in closed or locking position. When the steering column 3 is locked in this manner, the steering wheel 2 cannot be rotated, and the motor-vehicle is thus amply protected against theft or unauthorized use by the fact that it cannot be steered.

To release the lock the permutation wheels 29 are rotated until the correct combination of symbols is aligned on the indicator lines 35, and the locking member 10 is then actuated by its handle 21, causing the lug 12 to be disengaged from the jaw 13. This movement automatically releases the latch 6 which is pivotally moved upwardly by its coiled spring 16 to thereby disengage the tooth 15 from a recess 5 in the clutch block 4.

It will be noted that with the improved lock it is necessary to first set the permutation wheels at the correct combination before the locking member 10 can be retracted to allow the latch 6 to be locked. This feature is advantageous as it prevents the lock being unintentionally closed, and thereby minimizes liability of accident.

In constructing the lock the permutation wheels 29 may be arranged for setting along any one of the indicator lines 35 or along any number of indicator lines, thus increasing the number of different combinations which may be obtained without increasing the number of permutation wheels.

What we do claim is:—

1. A locking means for vehicle steering columns, comprising a casing having a movable wall, a rod controlling the movement of said wall, permutation locking means for governing the movement of the rod, a latch carried by the casing and terminally formed to interlock with the steering column, means whereby said latch is normally influenced toward an unlocking position, and means carried by the movable wall to hold the latch in locked position when the wall is in a predetermined position.

2. An improved locking device for vehicle steering columns, including a casing, a latch pivoted therein and terminally formed to interlock with the steering column, a spring connected with the latch to normally hold the latch in unlocked position, a section mounted for movement in the casing and formed to interlock with the latch to hold the latch in locked position, a rod connected to said section, and permutation locking means for holding the rod and section in position to interlock with the latch for permitting movement of the rod and section to release the latch through the influence of the spring.

3. An improved locking device for vehicle steering columns, including a casing, a latch pivoted therein and terminally formed to interlock with the steering column, a spring connected with the latch to normally hold the latch in unlocked position, a section mounted for movement in the casing and formed to interlock with the latch to hold the latch in locked position, a rod connected to said section, permutation locking means for holding the rod and section in position to interlock with the latch for permitting movement of the rod and section to release the latch through the influence of the spring, a housing for enclosing the latch, casing and connected parts, and a member connected to the section and extending through a wall of the housing to permit manual operation of the section.

4. An improved locking device for vehicle steering columns, including a casing, a latch pivoted therein and terminally formed to interlock with the steering column, a spring connected with the latch to normally hold the latch in unlocked position, a section mounted for movement in the casing and formed to interlock with the latch to hold the latch in locked position, a rod connected to said section, permutation locking means for holding the rod and section in position to interlock with the latch for permitting movement of the rod and section to release the latch through the influence of the spring, an enclosing housing, and a member extending from the latch through the housing to permit manual operation of the latch.

In testimony whereof we affix our signatures.

WILLIAM JOSEPH LILLICRAPP.
DANIEL LESLIE O'SHEA.
AUGUSTINE HOGAN.